(12) United States Patent
Burke et al.

(10) Patent No.: US 7,600,456 B2
(45) Date of Patent: Oct. 13, 2009

(54) MODULAR GUARD SYSTEM FOR A POWER SAW

(75) Inventors: Jeremy J. Burke, Jackson, TN (US); Mark S. Talesky, Huntley, IL (US); Peter Domeny, Northbrook, IL (US); Ravinder Voruganti, Barrington, IL (US); Adam S. Thomas, Aurora, IL (US)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 11/605,702

(22) Filed: Nov. 29, 2006

(65) Prior Publication Data

US 2007/0113715 A1 May 24, 2007

Related U.S. Application Data

(63) Continuation-in-part of application No. 11/284,214, filed on Nov. 21, 2005, now Pat. No. 7,437,981.

(51) Int. Cl.
*B27G 19/08* (2006.01)
(52) U.S. Cl. .................. 83/102.1; 83/477.2; 83/478
(58) Field of Classification Search .................. 83/478, 83/102.1, 477.2, 860, 544; 144/251.1, 251.3; 451/451, 454, 455
See application file for complete search history.

(56) References Cited

U.S. PATENT DOCUMENTS 307,112 A 10/1884 Groff
321,484 A 7/1885 Comer
660,481 A 10/1900 Barnard
713,196 A 11/1902 Bennett
1,089,223 A 3/1914 Jenkins (Continued)

FOREIGN PATENT DOCUMENTS

DE 910835 3/1954

(Continued)

OTHER PUBLICATIONS

"Elektra Beckum®" TS 250 Operating Instructions, Metabo, Germany, pp. 14-23.

(Continued)

*Primary Examiner*—Stephen Choi
(74) *Attorney, Agent, or Firm*—Greer, Burns & Crain, Ltd.

(57) ABSTRACT

A preferred embodiment of the present invention is directed to a modular saw guard system for a power saw of the type which has a table top, a rotatable circular saw blade, the table top having an opening through which the saw blade can extend, the system comprising a riving knife mounted to the saw rearwardly of the blade and having a top surface and at least one aperture near the top surface, a blade guard and kickback prevention mechanism that is releasably mounted to the riving knife, the mechanism comprising a mounting channel configured to fit on and be releasably attached to the riving knife, the blade guard portion being pivotally attached to the mounting channel, the kickback prevention portion being pivotally attached to the mounting channel; and a lever mechanism for holding the mounting channel to the riving knife and for releasing the mounting channel for removal therefrom, the lever mechanism including a movable pin member for engaging the aperture of the riving knife.

14 Claims, 8 Drawing Sheets

U.S. PATENT DOCUMENTS

| | | | |
|---|---|---|---|
| 1,118,477 A | 11/1914 | Davis | |
| 1,207,683 A | 12/1916 | Coyle | |
| 1,244,187 A | 10/1917 | Frisbie | |
| 1,258,961 A | 3/1918 | Tattersall | |
| 2,007,887 A | 7/1935 | Tautz | |
| 2,530,867 A | 11/1950 | Galanga | |
| 3,080,897 A * | 3/1963 | Winter | 83/750 |
| 3,348,836 A | 10/1967 | Smierciak | |
| 3,566,934 A | 3/1971 | Thrasher | |
| 4,076,227 A | 2/1978 | Rameson | |
| 4,615,247 A | 10/1986 | Berkeley | |
| 4,625,604 A | 12/1986 | Handler et al. | |
| 4,721,023 A | 1/1988 | Bartlett et al. | |
| 4,744,278 A * | 5/1988 | Wright | 83/839 |
| 4,805,505 A | 2/1989 | Cantlin | |
| 5,156,508 A | 10/1992 | Grisley | |
| 5,201,863 A | 4/1993 | Peot | |
| 5,235,752 A | 8/1993 | Sauerwein | |
| 5,287,779 A | 2/1994 | Metzger, Jr. | |
| 5,447,085 A | 9/1995 | Gochnauer | |
| 5,979,523 A | 11/1999 | Puzio et al. | |
| 6,131,629 A | 10/2000 | Puzio et al. | |
| 6,170,370 B1 | 1/2001 | Sommerville | |
| 6,405,624 B2 | 6/2002 | Sutton | |
| 6,502,809 B1 | 1/2003 | Gionta | |
| 6,578,460 B2 | 6/2003 | Sartori | |
| 6,644,157 B2 | 11/2003 | Huang | |
| 6,736,042 B2 | 5/2004 | Behne et al. | |
| 6,840,144 B2 | 1/2005 | Huang | |
| 6,986,370 B1 | 1/2006 | Schoene et al. | |
| 7,137,327 B2 | 11/2006 | Garcia et al. | |
| 7,210,386 B1 * | 5/2007 | Chang | 83/477.2 |
| 7,302,878 B2 * | 12/2007 | Chang | 83/477.2 |
| 2001/0035081 A1 | 11/2001 | Sutton | |
| 2002/0029822 A1 | 3/2002 | Jukoff | |
| 2004/0011177 A1 | 1/2004 | Huang | |
| 2004/0023773 A1 * | 2/2004 | Dombkowski | 493/340 |
| 2004/0103544 A1 | 6/2004 | Hartmann | |
| 2004/0118261 A1 | 6/2004 | Garcia et al. | |
| 2004/0255745 A1 | 12/2004 | Peot et al. | |
| 2004/0261592 A1 | 12/2004 | Chen | |
| 2005/0087049 A1 | 4/2005 | Miller et al. | |
| 2005/0160895 A1 | 7/2005 | Garcia | |
| 2005/0166736 A1 | 8/2005 | Gass et al. | |
| 2005/0188807 A1 | 9/2005 | Parks | |
| 2005/0211034 A1 | 9/2005 | Sasaki et al. | |
| 2005/0235793 A1 * | 10/2005 | O'Banion et al. | 83/478 |
| 2006/0011034 A1 | 1/2006 | Gehret et al. | |
| 2006/0032355 A1 | 2/2006 | Wang | |
| 2006/0042441 A1 | 3/2006 | Ichikawa | |
| 2006/0096428 A1 | 5/2006 | Garcia et al. | |
| 2006/0101962 A1 | 5/2006 | Garcia | |
| 2006/0260456 A1 | 11/2006 | Chang | |
| 2007/0056416 A1 * | 3/2007 | Shibata | 83/440.2 |
| 2007/0074613 A1 | 4/2007 | Yu | |

FOREIGN PATENT DOCUMENTS

| | | |
|---|---|---|
| DE | 910835 | 5/1954 |
| DE | 917746 | 7/1954 |
| DE | 917746 | 9/1954 |
| DE | 11 67 511 | 4/1964 |
| DE | 2364910 | 7/1975 |
| DE | 2917497 | 11/1980 |
| DE | 3137732 | 6/1983 |
| DE | 3315169 | 11/1983 |
| DE | 8807584 | 9/1988 |
| DE | 9306198 | 9/1993 |
| EP | 0012404 | 6/1980 |
| EP | 0605998 | 7/1994 |
| EP | 0633105 | 1/1995 |
| EP | 1491304 | 12/2004 |
| FR | 2239325 | 2/1975 |
| GB | 2273078 | 6/1994 |
| JP | 2005-262337 | 9/2005 |

OTHER PUBLICATIONS

"Powermatic®" Model 2000 Operating Instructions and Parts Manual, WMH Tool Group, Revision B Apr. 2006. pp. 1-43.

"Powermatic®" Model 2000 Operating Instructions and Parts Manual, WMH Tool Group, Revision A Nov. 2005. pp. 1-43.

Bosch 4000 Operating Instructions, 2007.

Roland Johnson, "10-in. Cabinet Saws", *Fine Woodworking*, May/Jun. 2006, pp. 46-51.

* cited by examiner

MODULAR GUARD SYSTEM FOR A POWER SAW

This application is a continuation-in-part of patent application entitled A MODULAR GUARD SYSTEM AND APPARATUS FOR A POWER SAW Ser. No. 11/284,214, filed Nov. 21, 2005 now U.S. Pat. No. 7,437,981.

BACKGROUND OF THE INVENTION

The present invention generally relates to power tools and, more particularly, to power table saws.

Power table saws typically have guard systems that either attach to the undercarriage of the table saw, to the rear of the table saw or attach to some structure above the table saw. In each of these configurations there are typically three components, namely, a splitter or riving knife, kickback prevention devices, (often called kickback dogs) and a blade guard that covers the blade. A riving knife is a safety device that reduces the likelihood of a kick-back event where a work piece is somehow caught or bound up during a cutting operation and the inertia of the blade throws the work piece back toward the user. A riving knife is typically considered to function similarly to a spreader or splitter on a blade guard assembly, but does not extend above the top of the blade.

With all known commercial table saw guard configurations, the end user cannot separate the riving knife from the other components. There are times when this is desirable based on the type of cut being made.

There are two basic types of cuts that are generally made with a table saw and those are through cuts and non-through cuts. During a through cut, the blade is protruding through the entire thickness of the work piece, and in this type of cut there are few problems with current table saw guard configurations. However, when making a non-through cut, the user must remove the guard system if the guard system is of the type which is attached to the undercarriage or the rear of the table saw. These mounting configurations are typically utilized on most portable and bench top models that are presently commercialized. Because there is a need to remove the guard system during non-through and other special types of cuts and because special wrenches or the like are often necessary to do so, many users simply leave the guard system off.

SUMMARY OF THE INVENTION

A preferred embodiment of the present invention is directed to a modular saw guard system for a power saw of the type which has a table top, a rotatable circular saw blade, the table top having an opening through which the saw blade can extend, the system comprising a riving knife mounted to the saw rearwardly of the blade and having a top surface and a predetermined thickness that is greater than the thickness of the blade body and less than the thickness of the kerf of the blade, the riving knife having at least one aperture near the top surface, a blade guard and kickback prevention mechanism that is releasably mounted to the riving knife, the mechanism having a blade guard portion above the blade and being adjustable to enable a work piece to be moved into cutting position by the blade and a kickback prevention portion configured to engage a work piece as it is being cut by the blade and apply resistance to prevent the work piece from being expelled in the reverse direction, the mechanism further comprising a mounting member configured to fit on and be releasably attached to the riving knife, the blade guard portion being pivotally attached to the mounting member, the kickback prevention portion being pivotally attached to the mounting member, a lever mechanism for holding the mounting member to the riving knife and for releasing the mounting member for removal therefrom, the lever mechanism including a movable pin member for engaging the aperture of the riving knife.

DETAILED DESCRIPTION

The preferred embodiment of the present invention comprises a modular guard system that has a riving knife mechanism, a blade guard mechanism and a kickback prevention mechanism, all of which can be either quickly adjusted, attached and/or removed. However, the riving knife mechanism must be attached to the table saw in a generally extended position if the blade guard mechanism or the kickback prevention mechanism is used, because these latter two mechanisms are attached to the riving knife mechanism.

A quick attachment mechanism for the riving knife is shown and described in the aforementioned application entitled A MODULAR GUARD SYSTEM AND APPARATUS FOR A POWER SAW Ser. No. 11/284,214, filed Nov. 21, 2004, which is specifically incorporated by reference herein. Because the embodiments described herein have a riving knife with a very similar lower mounting configuration as is shown and described in the above application, the description of the quick attachment mechanism is not provided here.

With the modular configuration of the embodiments of the present system, the end user is more likely to use the riving knife and the blade guard and kickback prevention mechanism for a particular task being carried out on the table saw, rather than the typical choice a user now has, which is that of attaching or removing all of these components as part of a single guard system. While the illustrated embodiments of the present invention are shown in connection with a power table saw, it should be understood that the system mechanisms can be utilized in other tools and environments, and that such other applications should be considered to be within the spirit and scope of the present invention. For example, embodiments of the present invention may be used with saws that are known as combo saws and flip saws that are marketed in Europe and possibly elsewhere.

While the modular design of the preferred embodiment of the present invention permits the removal of the riving knife mechanism together with the blade guard and the kickback prevention mechanism, the design is not meant to encourage such removal. In fact, what is encouraged is the use of these mechanisms at all times whenever practicable. However, the reality of decades of historical use of table saws is that commercial artisans as well as experienced woodworkers want to and do use table saws to make specialty cuts, including plunge cuts, cove cuts and dado cuts, for example. A plunge cut can be made by placing a work piece on the saw with the blade retracted, turning on the motor and cranking the blade upwardly to make a cut more or less in the middle of the work piece. A dado cut is one made with a dado blade that makes a wide cut, and is often used to cut a slot in a work piece, i.e., a non-through cut. A cove cut is a specialty non-through cut, where a work piece is guided by a jig of some type to move the work piece across the blade at an angle (and cutting only an eighth of an inch depth or less per pass) thereby using the curvature of the blade to cut and make a concave surface in the work piece.

These specialty cuts cannot be made with known conventional riving knifes, blade guards and kickback dogs being attached. Since commercial artisans and woodworkers remove them for such specialty tasks, the preferred embodiment of the present invention is configured to overcome many of the disadvantages of many conventional designs. One important feature is the elimination of the need to completely remove the riving knife mechanism to make some of the specialty cuts described above. For example, It will not need to be removed for a dado cut. It may need to be removed for a cove cut if it goes too deep, and similarly for a plunge cut. If the blade guard and kickback prevention mechanism is detached from the riving knife, the riving knife can be easily retracted out of the way. After such specialty cuts are completed, the riving knife can then be easily adjusted to its extended position where the blade guard mechanism kickback prevention mechanism can be quickly attached. Another benefit of the adjustable riving knife is that it maintains it alignment relative to the blade and therefore does not have to be realigned when it is adjusted to its extended positions Turning now to the drawings and particularly FIGS. 1-8, there is shown a major portion of a modular saw guard system, indicated generally at 20, that includes a riving knife 22, a blade guard and kickback prevention mechanism, indicated generally at 24. The blade guard and kickback prevention mechanism 24 has a quick release assembly 26 that enables it to be easily mounted on and removed from the riving knife 22.

The riving knife 22 is adjustable so that its elevation relative to the blade can be changed. When it is used as a standard guard, the blade guard and kickback prevention mechanism 24 is attached to it and the system 20 is then easily attached to a designated mounting post which not shown but is located below the top T of the table (see FIG. 6) as is well known to those skilled in the art, and either moves up and down with the movement of the blade when it has an undercarriage mount, or stays in position relative to the top of the table when it is in a rear tool mount position.

When the system is used as a splitter, the blade guard and kickback prevention mechanism 24 can be removed quickly by using its quick release assembly 26, and the saw can now perform standard through cuts with the added safety of the riving knife 22 in position. The removal of the blade guard and kickback prevention mechanism is desired on some cuts due to the need for the operator to have more visual guidance, and to avoid any undesirable scratches or markings on the material being cut from the kick back arms. In this position, the riving knife 22 rides directly behind the blade, and is higher than the top of the blade.

When used as a riving knife for linear moving undercarriage mounts only, the blade guard and kickback prevention mechanism 24 are removed from the riving knife 22 and the riving knife is mounted in an intermediate position where it is operated as a conventional riving knife, as opposed to a separator or splitter. In this position, the top of the riving knife is below the top edge or reach of the blade by a distance that is preferably between 3 and 5 millimeters. In this position, the user has the added security of the riving knife operating as a splitter which prevents the two cut work piece parts from closing on one another behind the blade which can bind the blade and create a kickback condition. It can also be used in the non-through cut mode where the top of the riving blade mechanism will penetrate into the partial cut line. In this regard, it should be understood that the riving knife 22 is mounted to a motor and arbor gear box assembly (not shown but also well known to those skilled in the art) that drives the blade and is vertically as well as angularly adjustable. Since the elevation and angle of riving knife 22 changes as the motor and arbor gear box assembly changes, the position of the riving knife 22 is constant relative to the blade.

Figure 5:
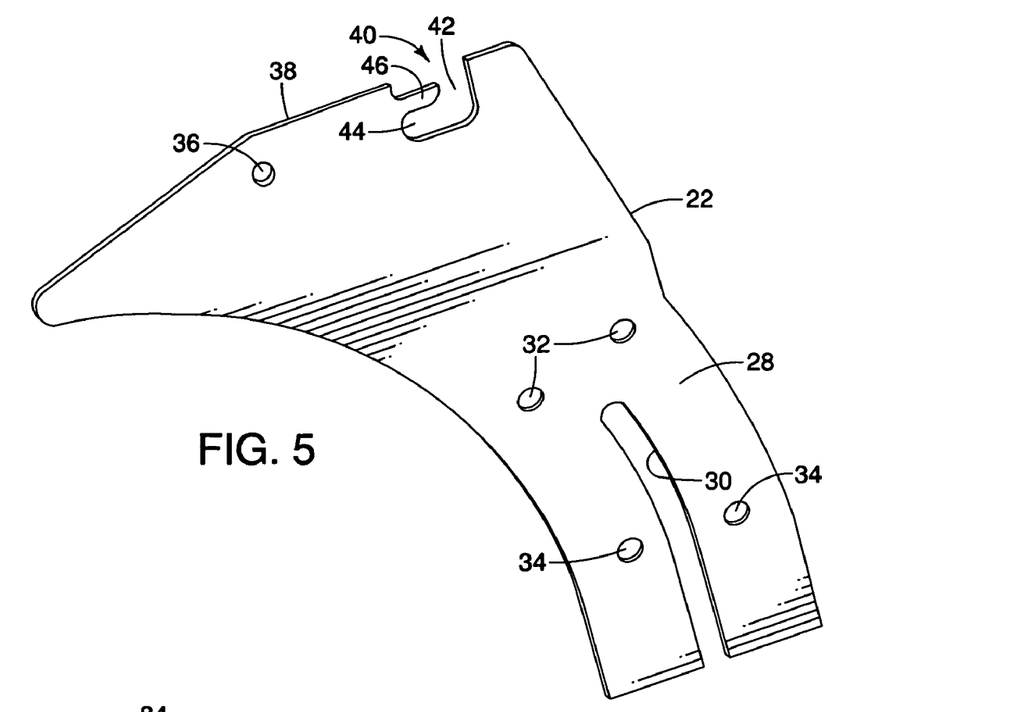
FIG. 5 is a perspective of the right side of the riving knife of the system shown in FIGS. 1 and 2.
Figure 6:
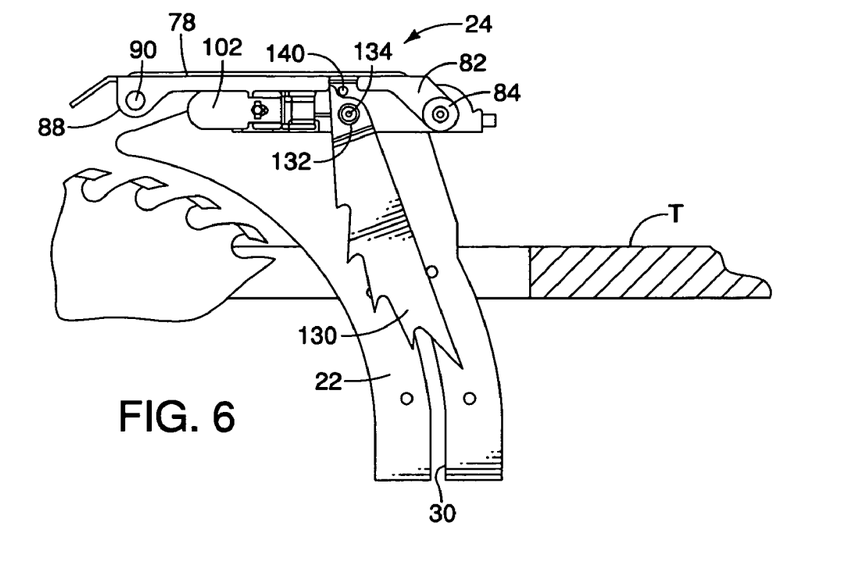
FIG. 6 is a plan view of the right side of the system shown in FIG. 1, particularly illustrating the blade guard mechanism hinge in its operating position.
Figure 7:
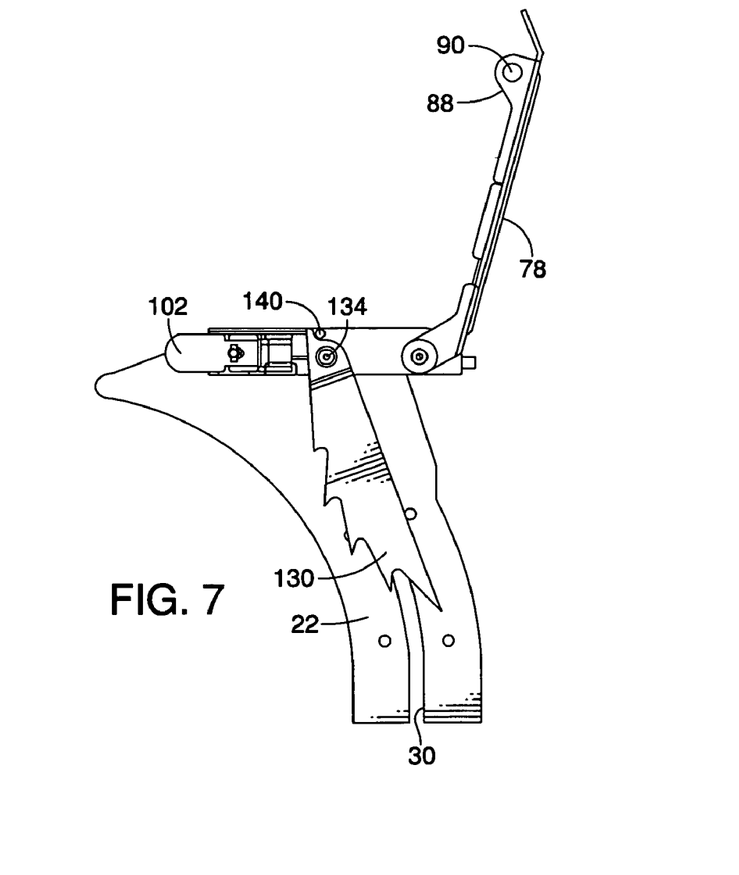
FIG. 7 is a plan view of the right side of the system shown in FIG. 1, particularly illustrating the blade guard mechanism hinge in its raised non-operating position.

The riving knife 22 is preferably a steel stamping and has an elongated generally curved thin base portion as shown in FIG. 5, with a center slot 30 that extends from the bottom to the center portion of its height. There are two apertures 32 and 34 which are located on opposite sides of the slot 30, for attaching the riving knife 22 to the mounting post of the saw. The knife 22 also has an aperture 36 positioned near its substantially flat top surface 38 and a slot, indicated generally at 40, which has a vertical portion 42 defining an opening that merges with a forwardly (i.e., toward the blade) extending portion 44 that define a shelf 46 for retaining the rear end of blade guard and kickback prevention mechanism 24.

In this regard, and referring to FIGS. 1-4, 6 and 7, the blade guard and kickback prevention mechanism 24 has an elongated U-shaped mounting channel 48 that has a top portion 50 and spaced apart legs 52 and 54 that extend downwardly from the top portion.

Figure 9:
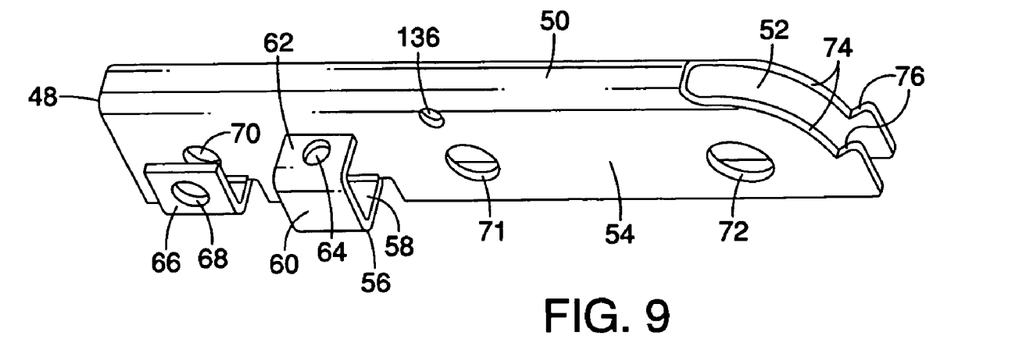
FIG. 9 is a perspective view of the right side of a portion of blade guard and kickback prevention mechanism shown in FIG. 8, and particularly illustrating a mounting channel configured to fit on and be releasably attached to the riving knife.

As is best shown in FIG. 9, an extension 56 from the leg 54 has a transverse first portion 58 a vertical portion 60 and return portion 62, with portions 58 and 62 having apertures 64 for receiving a hinge pin. A second extension 66 extends outwardly from the leg 54 and then vertically and it has aperture 68 that is aligned with apertures 70 in the legs 54 and 52. The apertures 68 and 70 are provided to receive a locking pin for locking the channel 48 to the riving knife 22. Apertures 71 are provided in each of the legs 52 and 54 for attachment to kickback arms and apertures 72 are provided for pivotally supporting the blade guard portion of the blade guard and kickback prevention mechanism 24. The legs 52 and 54 have curved end portions 74 that terminate in transverse stop surfaces 76 for limiting movement of a blade guard hinge 78 when the blade guard is moved upwardly into a non-protecting, non-operative position.

Figure 3:
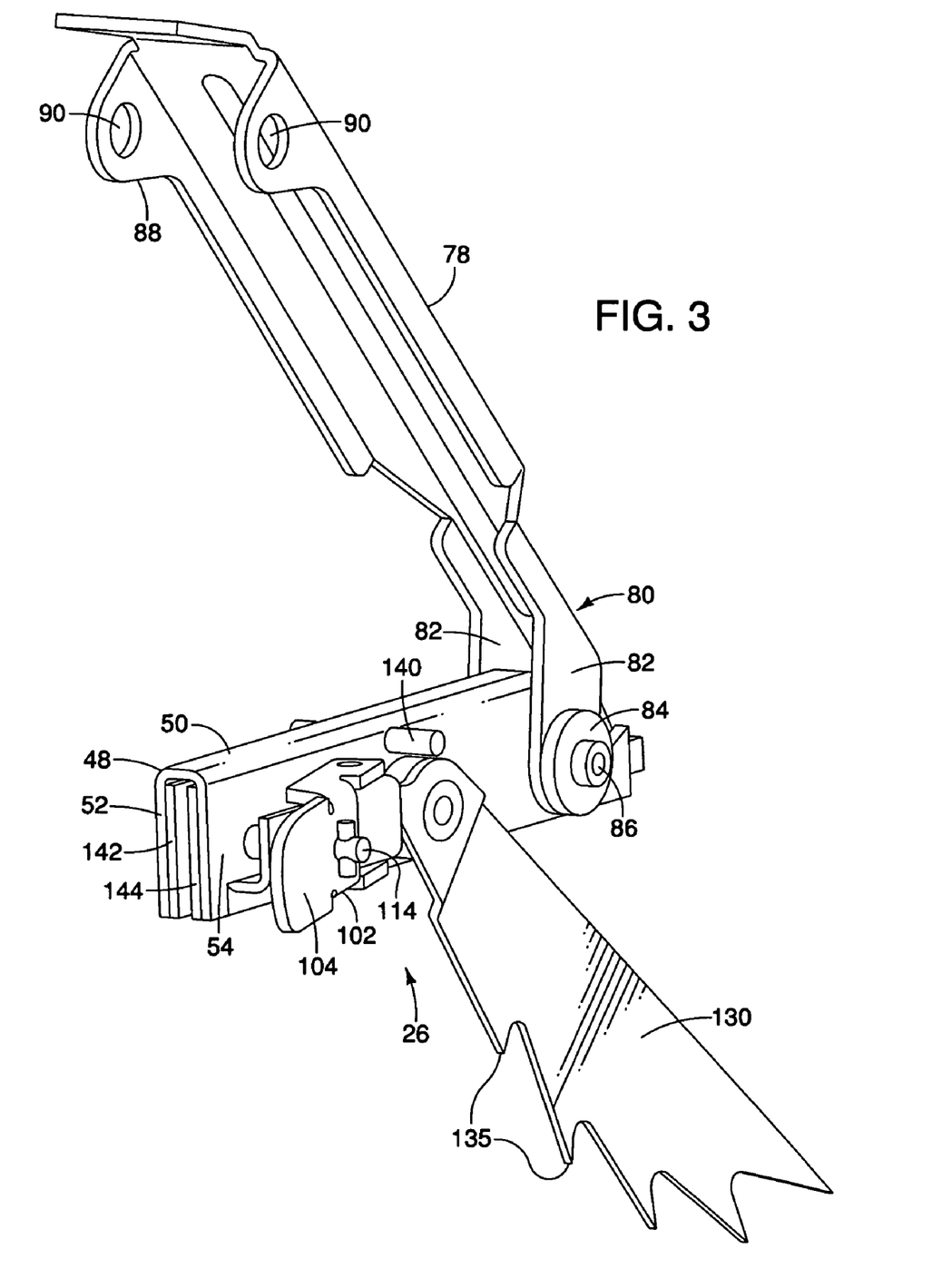
FIG. 3 is another perspective view of front right side of the mounting channel and kickback prevention mechanism portion of the system shown in FIG. 1.
Figure 12:
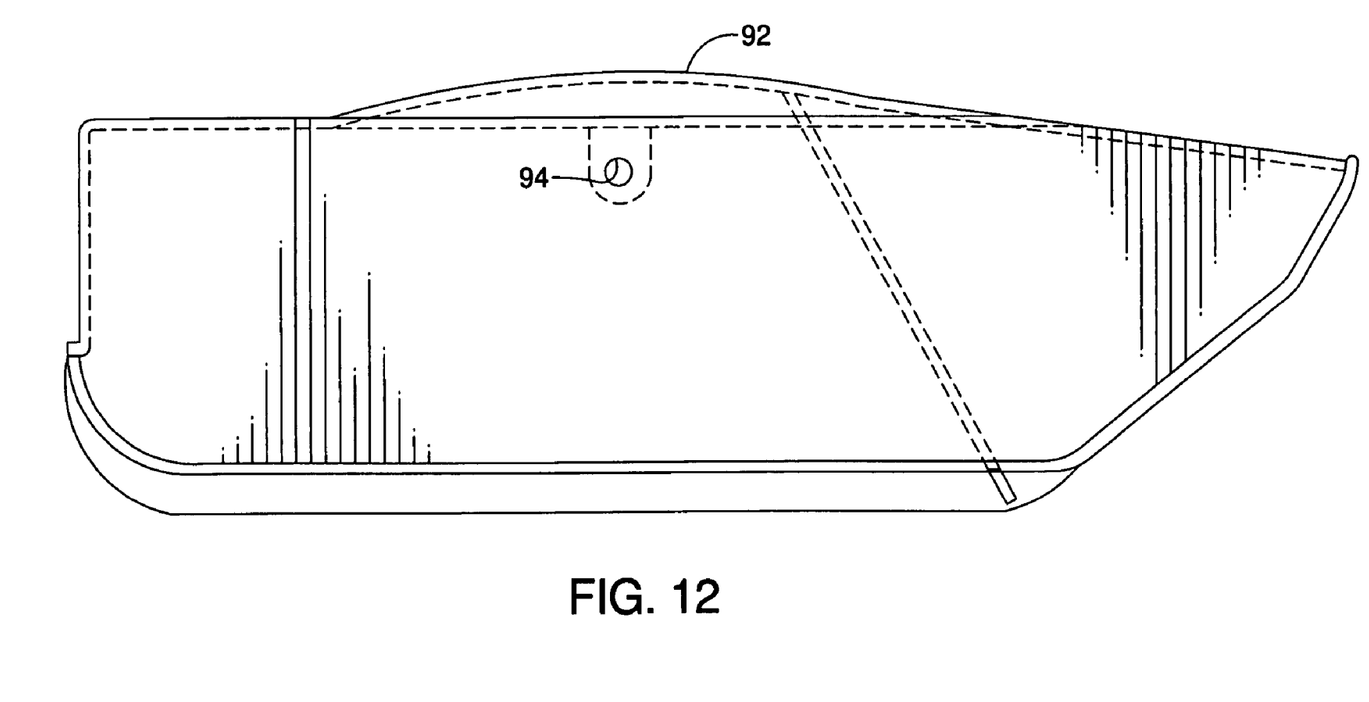
FIG. 12 is a simplified side view of an upper blade guard portion that attaches to the blade guard mechanism hinge.

As is apparent from the foregoing discussion, and as best shown in FIG. 3, the U-shaped channel 48 supports the blade guard hinge 78 which has a lower mounting portion 80 that has two spaced apart legs 82 with apertures for receiving a pair of cylindrical bushings 84 that fit in these apertures and in apertures 72 in the sidewalls 52 and 54. The bushings 84 are preferably held together with a rivet 86 that is installed into apertures in the bushings, with the reduced diameter portions of the bushings being sized to closely fit in the apertures 72 of the mounting channel 48. The hinge 78 has a pair of transverse flanges 88 which have apertures 90 which are sized to receive attachment pins, rivets, screws, bolts or other connecting means that permit pivoting movement (not shown) for attaching an upper guard 92 (see FIG. 12) that has an aperture 94 for receiving a connector such as a rivet, bolt or the like for attaching the hinge 78 to the upper guard 92. The upper guard 92 is preferably made from a clear polycarbonate or other plastic material and covers the blade during cutting operations.

The quick release assembly 26 enables the U-shaped channel 48 to be easily and quickly attached and removed from the riving knife 22. Referring to FIGS. 1, 3, 4, 10 and 11, the assembly 26 includes a release lever 102 having a free end portion 104 that presents a handle for an operator, with the lever 102 having a mounting end comprising two spaced mounting portions 106, each of which have an aperture 108 for receiving a hinge pin 110 that pivotally connects the release lever 102 to the U-shaped channel 48. Midway between the ends of the release lever 102 is an elongated slot 112 in which a release pin 114 is provided.

Figure 11:
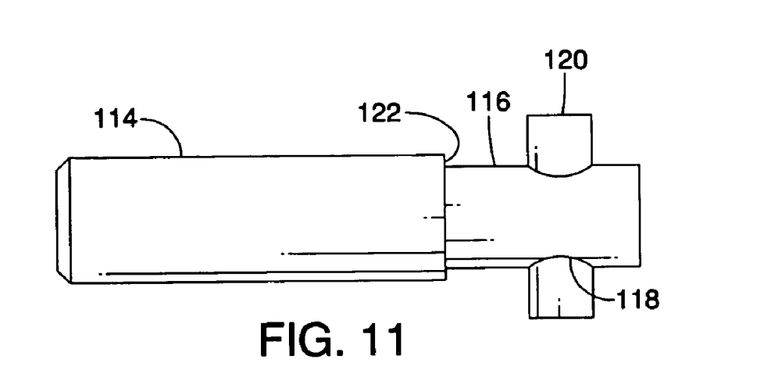
FIG. 11 is a plan view of the right side of a portion of blade guard and kickback prevention mechanism shown in FIG. 8, and particularly illustrating a movable pin member for engaging the aperture of the riving knife.

As best shown in FIG. 11, the release pin 114 has a reduced diameter portion 116 and it has an aperture 118 which a locking pin 120 is press fit into. The reduced diameter portion 116 defines a shoulder 122 which contacts the interior surface of the release lever 102. The pin 114 is positioned in apertures 68 and 70 when it is in locking position. However, when the release member lever 102 is pulled away from the riving knife 22, the release pin disengages from aperture 36 in the riving knife 22.

Figure 4:
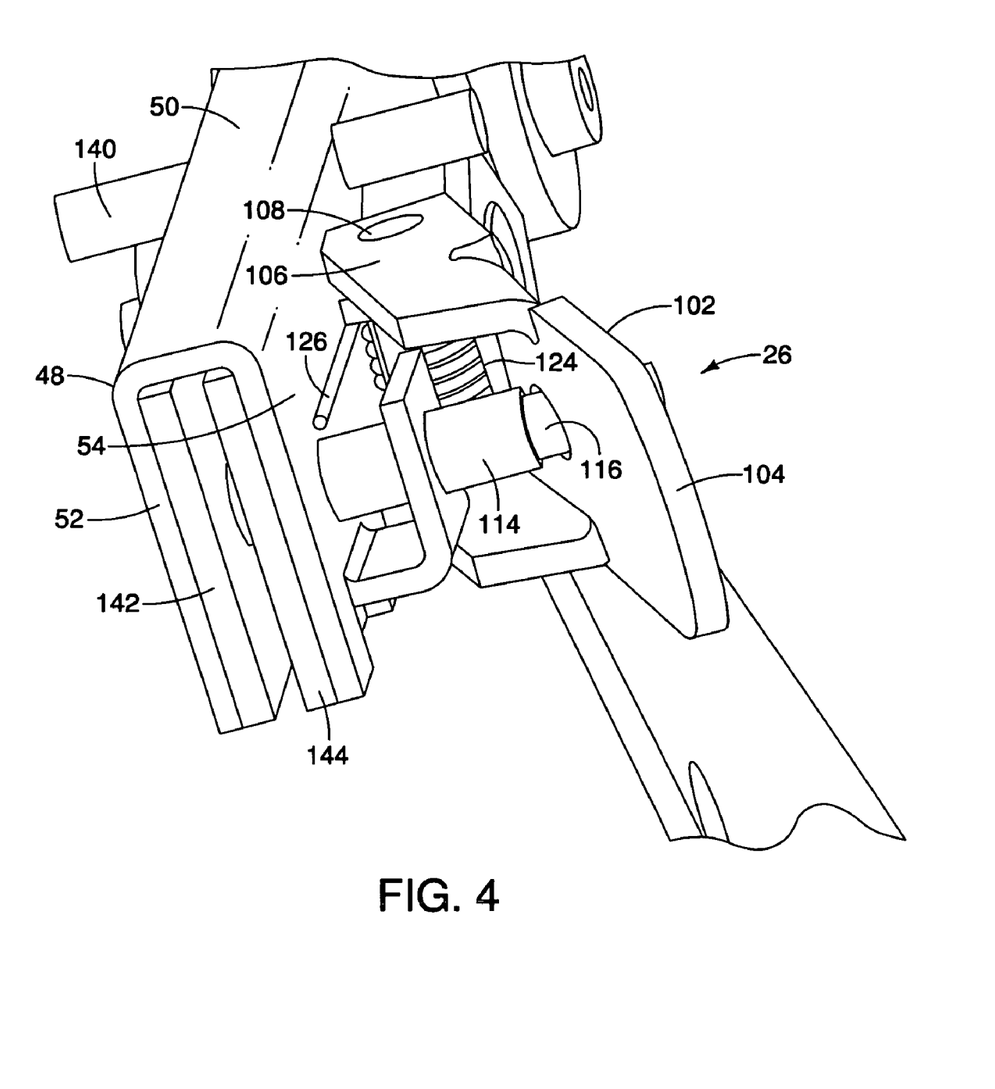
FIG. 4 is an enlarged perspective view of a portion of the mounting channel and kickback prevention mechanism shown in FIG. 3.
Figure 10:
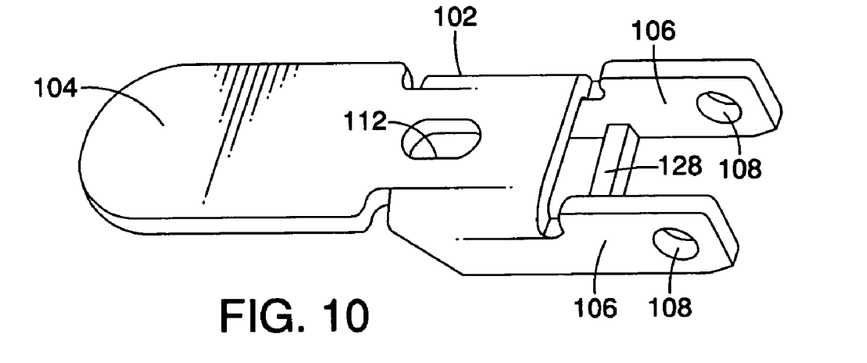
FIG. 10 is a perspective view of the right side of a portion of blade guard and kickback prevention mechanism shown in FIG. 8, and particularly illustrating a lever mechanism for holding the mounting channel to the riving knife and for releasing the mounting channel.

When the blade guard and kickback prevention mechanism 24 is mounted on the riving knife 22, the assembly 26 is biased to remain secured to the riving knife 22. As best shown in FIGS. 4 and 10, this is done by a torsion spring 124 that has one end 126 bearing upon the sidewall 54 and the other end biased against a bridge portion 128 of the release lever 102.

Figure 8:
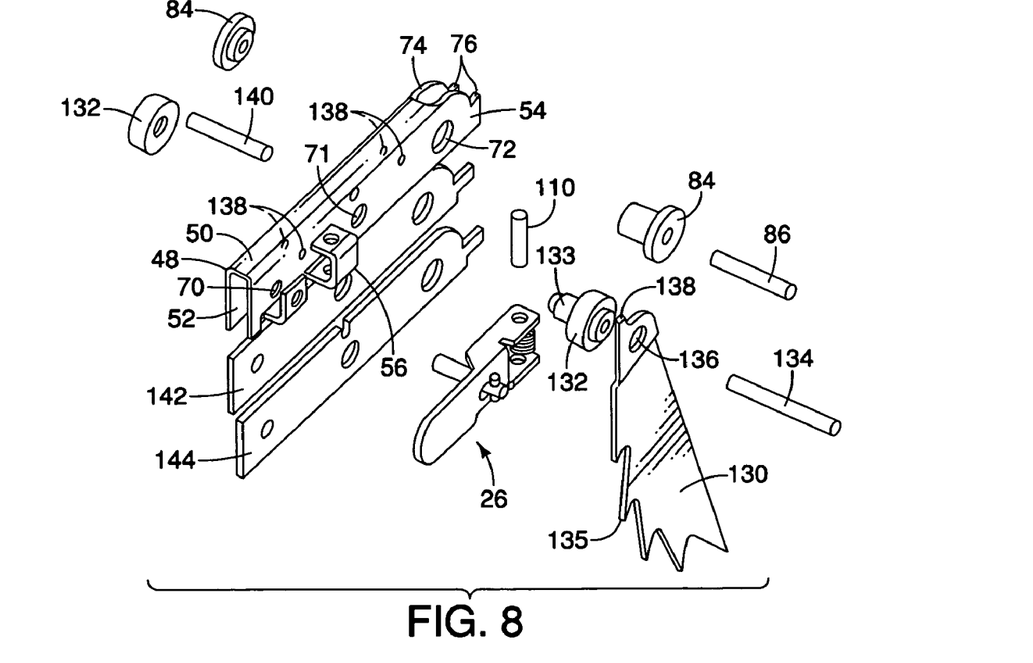
FIG. 8 is an exploded perspective of a portion of the blade guard and kickback prevention mechanism shown in FIG. 1.

The kickback prevention functionality is provided by a pair of arms 130 that have one or more points 135 in the lower surface thereof that are configured to engage the work piece and prevent it from being expelled back toward the operator if a kickback condition arises. The arms 130 are pivotable around bushings 132 and a rivet 134 is installed between the two bushings 132. As best shown in FIG. 8, the rightward bushing 132 has a reduced diameter left portion 133 that is sized to preferably snugly fit aperture 71 in the legs 52 and 54 of the channel 48 and the openings in plates 142 and 144. The diameter of this portion 133 also corresponds to the width of the portion 42 and the height of portion 44 of the slot 40 of the riving knife 22. The length of the portion 133 is sufficient to extend across the gap between the legs 52 and 54 and also to be seated in the apertures 71 of both legs. Alternatively, the bushings 132 as well as bushings 84 may be complimentary in construction so that they can be press fit together without the use of a connecting pin.

The kickback arms 130 have an aperture 136 on one end thereof together with an end ear 138 that extends away from the aperture 136 that is configured to engage a stop pin 140 to limit the movement of the arms 130 in the downward direction. The apertures 136 of the arms 130 are sized to fit the cylindrical bushings 132. Also, torsion springs (not shown) are provided and fit around each bushing 132 that have one end that bear against the stop pin 140 and an opposite end that bear against the back edge of each of the arms 130.

When the blade guard and kickback prevention mechanism 24 is to be mounted to the riving knife 22, the channel 48 is placed over the flat portion 38 so that the portion 133 of the bushing that extends between the legs 52 and 54 fits into the slot 40 and is moved forwardly into the horizontal portion 44 so that it is held captive by the shelf 46. When it is this forward position, the release pin 114 of the assembly 26 is aligned with the aperture 36 of the riving knife 22 and can be inserted to lock the blade guard and kickback prevention mechanism 24 in place. It should be understood that the channel 48 will not seat horizontally unless and until the operator pulls the handle 104 away from the channel 48 to enable the pin 114 to clear the riving knife 22. Once the channel is properly seated, the operator can release the handle 104 and the spring 124 will drive the pin 114 into the apertures 70 and 36.

Figure 1:
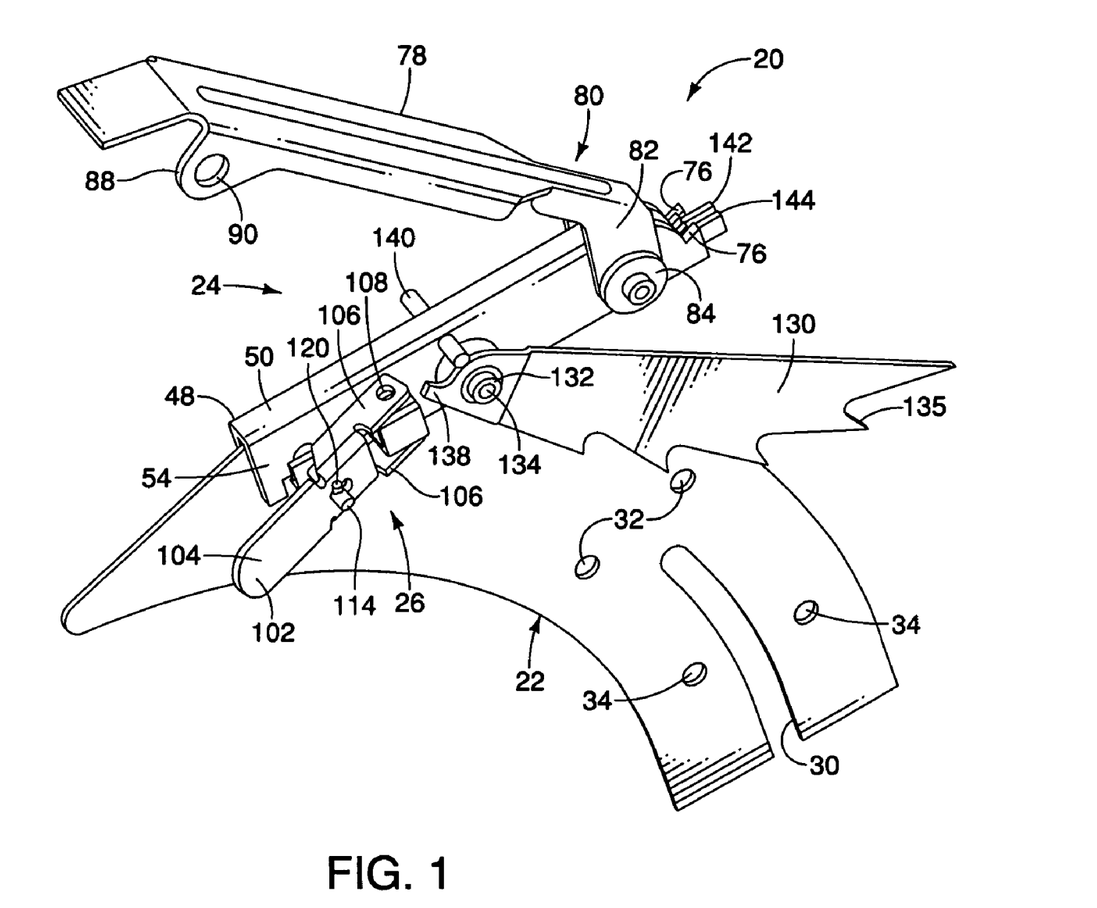
FIG. 1 is a perspective view of the front right side of the preferred embodiment of a modular guard system of the present invention.
Figure 2:
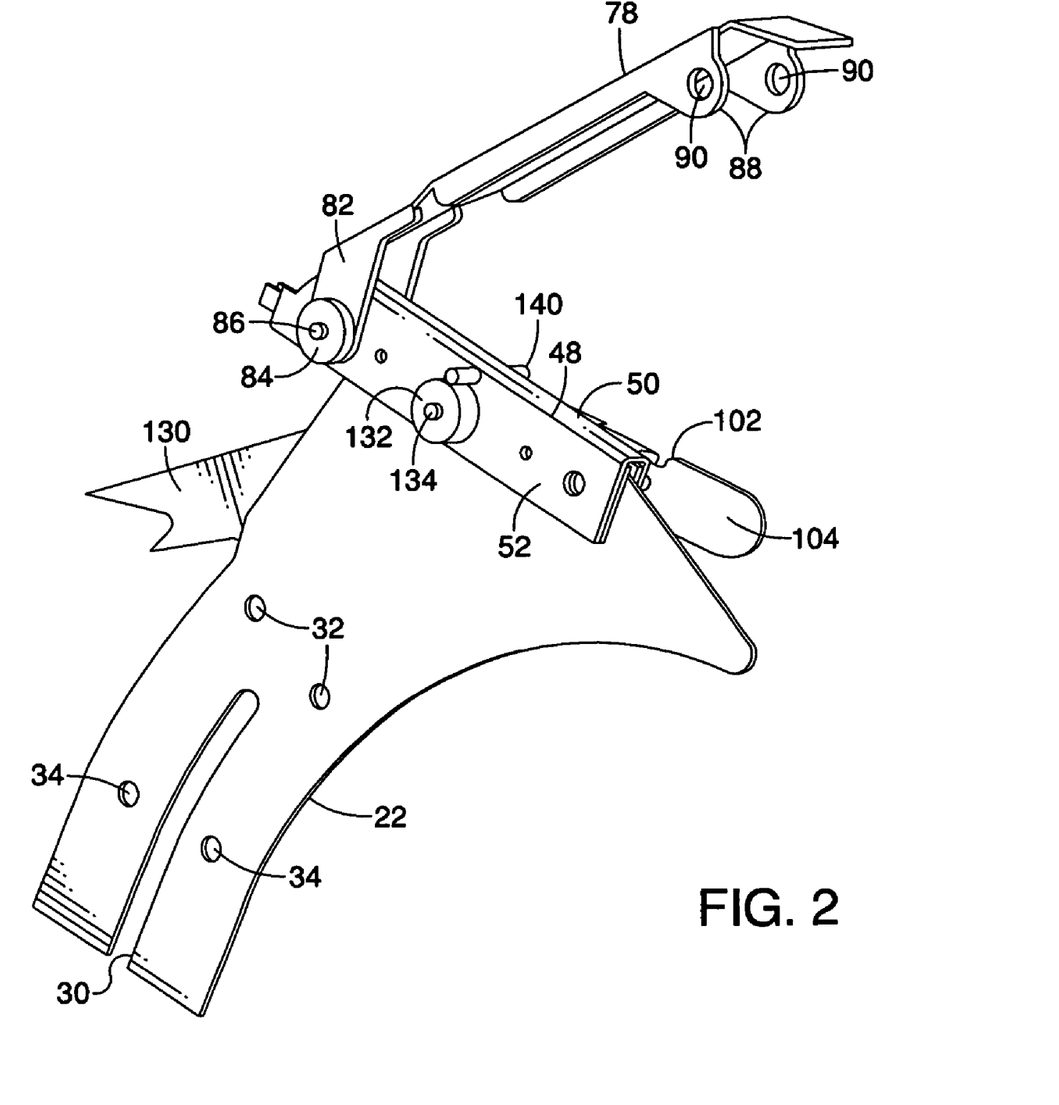
FIG. 2 is a perspective view of the front left side of the system shown in FIG. 1, with portions removed.

Removal of the blade guard and kickback prevention mechanism 24 merely requires the operator to pull the handle 104 outwardly to remove the pin 114 from the aperture 36, which permits sliding the blade guard and kickback prevention mechanism 24 rearwardly (i.e., to the right as shown in FIG. 1, for example) so that the bushing 132 can clear the shelf 46 and the mechanism separated from the riving knife 22.

It is desirable to have the thickness of the riving knife 22 be a predetermined thickness that is greater than the thickness of the blade body and less than the thickness of the kerf of the blade, (the kerf being the width of cut made by the saw blade). The blade guard and kickback prevention mechanism 24 of the preferred embodiment of the present invention allows the upper guard hinge 78, upper guard 92 and kickback arms 130 to be used with the U-shaped channel 48 when knives of different thicknesses are used. This is achieved by the use of shims 142 and 144 that are positioned on the inside of the legs 52 and 54. They are retained by set screws (not shown) that fit within apertures 138 in the sidewalls 52 and 54 that can be adjusted to position the spacing between the shims 142 and 144 to accommodate riving knifes 22 of different thicknesses. The shims have apertures sized and aligned with apertures in the legs 52 and 54 where necessary so that the functionality or operability of the system is not impaired.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A modular saw guard system for a power saw of the type which has a table top, a rotatable circular saw blade, the table top having an opening through which the saw blade can extend, said system comprising:

a riving knife mounted to the saw rearwardly of the blade and having a top surface and a predetermined thickness that is greater than the thickness of the blade body and less than the thickness of the kerf of the blade, said riving knife having at least one aperture near said top surface and a slot in said top surface spaced from said aperture, said slot extending downwardly and toward said riving knife aperture;

a blade guard and kickback prevention mechanism that is releasably mounted to said riving knife, said mechanism having a blade guard portion above the blade and being adjustable to enable a work piece to be moved into cutting position by the blade and a kickback prevention portion configured to engage a work piece as it is being cut by the blade and apply resistance to prevent the work piece from being expelled in the reverse direction, said mechanism further comprising:

a mounting member configured to fit on and be releasably attached to said riving knife wherein said mounting member is elongated and has a generally U shaped cross section with spaced legs connected to one another by a center portion, said mounting member having leg apertures aligned with said riving knife aperture and thereby being configured to be locked to said riving knife when a pin member engages said aperture of said riving knife and said leg apertures of said mounting member;

said blade guard portion being pivotally attached to said mounting member;

said kickback prevention portion being pivotally attached to said mounting member and comprising a shaft that fits within aligned kickback apertures in said legs of said mounting member and said shaft being configured to fit within said slot when said mounting member is attached to said riving knife;

a lever mechanism for holding said mounting member to said riving knife and for releasing said mounting member for removal therefrom, said lever mechanism including said movable pin member for engaging said aperture of said riving knife.

2. A modular saw guard system as defined in claim 1 wherein said kickback prevention portion comprises at least one elongated pivotable kickback arm mounted on said shaft, with the arm having at least one sharp surface for engaging a work piece to prevent reverse movement of the work piece during a cutting operation.

3. A modular saw guard system as defined in claim 2 wherein said kickback prevention portion comprises a pair of said elongated arms located on opposite sides of said mounting channel.

4. A modular saw guard system as defined in claim 2 wherein said aligned kickback apertures are spaced from said riving knife aperture.

5. A modular saw guard system as defined in claim 4 wherein said riving knife has a slot in said top surface spaced from said riving knife aperture, said slot extending downwardly and toward said riving knife aperture, said kickback prevention portion shaft being configured to fit within said slot when said mounting channel is attached to said riving knife, said mounting channel being locked to said riving knife when said pin member engages said aperture of said riving knife.

6. A modular saw guard system as defined in claim 1 wherein said blade guard portion comprises a shaft that fits within aligned blade guard apertures in each of said legs of said mounting channel, and an elongated pivotable support hinge mounted on said shaft.

7. A modular saw guard system as defined in claim 6 wherein said blade guard portion further comprises an upper guard portion pivotally attached to said support hinge, said upper guard portion extending over and forwardly of the blade.

8. A modular saw guard system as defined in claim 1 wherein said lever mechanism comprises an elongated release lever that is pivotally attached to one of said legs of said mounting channel, said release lever having said pin member attached thereto.

9. A modular saw guard system as defined in claim 8 wherein said lever mechanism further comprises a spring for biasing said lever mechanism for holding said mounting channel to said riving knife.

10. A modular saw guard system as defined in claim 9 wherein said spring biases said release lever toward said mounting channel so that said pin member is biased toward engagement with said riving knife aperture.

11. A modular saw guard system as defined in claim 10 wherein said spring is a preloaded torsion spring having one end contacting said release lever and an opposite end contacting said mounting channel.

12. A modular saw guard system as defined in claim 1 wherein said mounting channel has a top portion and a pair of spaced apart legs extending downwardly from said top portion, said guard system further comprising at least one removable shim plate positioned between said legs, the thickness of said at least one shim plate preferably resulting in said mounting channel being relatively tight fitting on said riving knife.

13. A modular saw guard system for a power saw of the type which has a table top, a rotatable circular saw blade, the table top having an opening through which the saw blade can extend, said system comprising:

a riving knife mounted to the saw rearwardly of the blade and having a top surface and a thickness approximating the thickness of the blade, said riving knife having at least one aperture near said top surface, and a slot in said top surface spaced from said aperture, said slot extending downwardly and toward said riving knife aperture;

a blade guard and kickback prevention mechanism configured to be releasably mounted to said riving knife, said mechanism having an blade guard portion and a kickback prevention portion configured to engage and apply resistance to prevent a work piece from being expelled, said mechanism further comprising:

a mounting channel configured to fit on and be releasably attached to said riving knife, said mounting channel extending along a substantial portion of the length of the top of said riving knife and comprising a top portion with spaced apart downwardly extending legs, each leg having an aperture coextensive with said aperture in said riving knife whereby a movable pin member engages said riving knife aperture and said leg apertures when said mounting channel is attached to said riving knife;

said blade guard portion being pivotally attached to said mounting channel;

said kickback prevention portion being pivotally attached to said mounting channel and having a center shaft configured to fit within said riving knife slot when said mounting channel is attached to said riving knife, said mounting channel being locked to said riving knife when said pin member engages said aperture of said riving knife;

a lever mechanism for releasably holding said mounting channel to said riving knife, said lever mechanism including said movable pin member for engaging said aperture of said riving knife and said leg apertures of said mounting channel.

14. A modular saw guard system as defined in claim 13 wherein said lever mechanism is movable between a retaining position and a release position, said mechanism further comprises a spring for biasing said lever mechanism toward its retaining position.

\* \* \* \* \*